C. E. STOKES.
PACKING.
APPLICATION FILED FEB. 3, 1915.
1,151,227.
Patented Aug. 24, 1915.
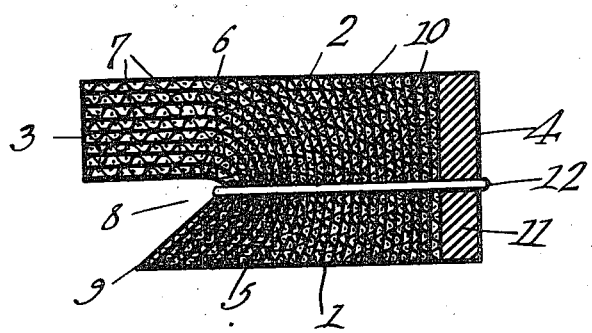
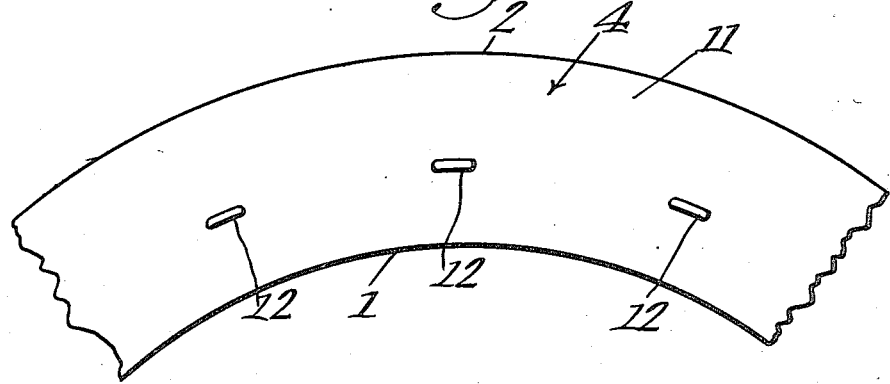
C. E. Stokes
Inventor

UNITED STATES PATENT OFFICE.

CHARLES E. STOKES, OF TRENTON, NEW JERSEY.

PACKING.

1,151,227.   Specification of Letters Patent.   Patented Aug. 24, 1915.

Application filed February 3, 1915. Serial No. 5,948.

*To all whom it may concern:*

Be it known that I, CHARLES E. STOKES, a citizen of the United States, residing at Trenton, in the county of Mercer and State of New Jersey, have invented a new and useful Packing, of which the following is a specification.

The present invention appertains to packings, and aims to provide a novel and improved stuffing box packing coöperable with a piston rod or other reciprocatory member working through the stuffing box, to provide a steam or fluid tight joint.

The object of the invention is the provision of a packing composed of a rubber or similar composition or compound, and a tough pliable fabric or similar material, the parts being so formed and assembled, as to render the packing thoroughly efficient and durable in its use.

It is also within the scope of the invention, to provide a packing of the nature indicated which is simple and inexpensive in construction and manufacture, and which will effectively resist the destructive forces to which it is subjected in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in its preferred embodiment in the accompanying drawing, wherein:—

Figure 1 is a sectional view of the improved packing. Fig. 2 is a fragmental elevation of a packing ring formed from the improved packing strip.

The present packing has the active face 1 to contact with and bear against the piston rod or reciprocatory member, the face 2 remote from the active face 1, and the sides 3 and 4. Between the point 5 of the active face 1 and the side 3, and between the point 6 of the remote face 2 and the side 3, the packing is composed of a plurality of longitudinal strips 7 of fabric or other tough and pliant material. The strips 7 are impregnated with a suitable rubber or equivalent composition or compound which resists water and steam, and which is capable of binding the layers or strips together. The strips 7 which are laid together, are bent or doubled transversely about a longitudinal line to form a V-shaped recess 8 between the active face 1 of the packing and the side 3, and the recess 8 provides a flexible or pliable lip 9 adjacent the active face 1 of the packing. The lip 9 is adapted to be pressed against the piston rod when the steam impinges against the lip, thereby to provide a steam or fluid tight joint between the packing and piston rod. Due to the bending of the strips 7, that strip 7 which is remote from the recess 8 will extend along a curved line, and all of the strips 7 extend around the recess 8 from the active face of the packing to the side 3. The layers or strips 7 in passing along curved lines from one side of the recess 8 to the other side thereof, prevent the packing from being ripped apart at the sharp angle defined by the recess 8, and in this manner, the lip 9 is prevented from tearing loose from the body of the packing.

From the strips 7 to the remote side 4 of the packing, the packing embodies a plurality of strips or layers 10 of fabric or other tough pliable material, and the strips 10 extend longitudinally of the packing, and their edges terminate at the active and remote faces 1 and 2, respectively, of the packing. The strips or layers 10 adjacent the strips 7 are curved to conform to the curvature or bend of the strips 7, and the strip or strips 10 remote from the strips 7 are approximately flat or even. If desired, a solid rubber backing 11 may be employed, this being optional. The backing 11 rests against the strip 10 remote from the strips 7, and forms the side 4 of the packing, the edges of the backing 11 being extended to and being flush with the active and remote faces of the packing.

Attention is directed to the fact, at this point, that although the following description includes the rubber backing or strip 11, it is to be understood that it may be eliminated when not desired in the finished packing.

In assembling the strips or layers 7, 10 and 11, they are placed within a suitable mold, and are pressed firmly together, it being understood that the strips 7 and 10 are impregnated with the rubber or equivalent composition, and whereby the pressure given to bear will not only form the strips into shape, as seen in Fig. 1, but will also cause them to adhere to one another, thereby to provide a unitary or integral structure.

It is preferable to secure the strips together by additional securing means, and to this end, stitches or other securing elements 12 may be engaged through the strips between and approximately parallel with the faces of the packing, and at suitably spaced points, whereby the stitches or securing elements 12 will assist in holding the strips together. The stitches or securing elements 12 extend through the strips 7, 10 and 11 to the angle of the recess 8, and therefore assist in holding the strips or layers in shape. The strips 10 being secured to the curved back of the strips 7 will also assist in holding the strips 7 in shape, and to prevent their straightening out. The packing thus constructed will be of strip-like form and can be readily cut up into the desired lengths to enable the packing rings to be formed in the usual manner.

Since the use of packings broadly resembling the present packing is well known, a lengthy description of the use of the present packing is unnecessary and will be obvious to those skilled in the art. Attention is directed, however, to the numerous advantages of the present packing as above pointed out, and it will be noted that the present packing avoids the use of layers running parallel with the active face of the packing and the face of the piston rod, such as are used in ordinary packings, and which are objectionable. Thus, when the layers of fabric or similar material are arranged parallel with and adjacent the active face of the packing, the packing, after subjected to wear, will cause the layers to fray and become loosened due to the reciprocation of the piston rod against the packing. With the present device, the layers or strips have their edges extending to the active face of the packing, and this will prevent the loosening or fraying of the layers, and will also provide a snug fit between the packing and piston rod. It will also be noted that those strips or layers nearest or adjacent the lip 9 are arranged at an acute angle relative to the active face of the packing, while the strips remote from the lip 9 are arranged almost or approximately perpendicular with the active face of the packing. Thus, the strips or layers 10 will uphold the body of the packing and the portions of the strips 7 constituting the lip 9 will enable the lip 9 to flex properly against the piston rod.

Having thus described the invention, what is claimed as new is:—

1. A packing comprising a plurality of layers, doubled transversely and formed to provide a recess and adjacent lip, and a portion secured to the bend of the first mentioned layers.

2. A packing comprising a plurality of layers, doubled transversely and formed to provide a recess and adjacent lip, a portion secured to the bend of the first mentioned layers, and securing elements engaged through the said parts and extending to the said recess.

3. A packing comprising a plurality of layers doubled transversely and formed to provide a recess and adjacent pliant lip, the layers extending around the said recess; and a plurality of layers secured to the bend of the first mentioned layers and having their edges extending to the active face of the packing.

4. A packing comprising a plurality of layers doubled transversely and formed to provide a recess and adjacent pliant lip, the layers extending around the said recess; a plurality of layers secured to the bend of the first mentioned layers and having their edges extending to the active face of the packing; and securing elements engaged through all of the layers and extending to the said recess.

5. A packing comprising a plurality of longitudinal strips doubled transversely and formed to provide a recess and adjacent lip, the strips extending around the said recess, and the edges of the strips terminating in the active face of the packing; and a plurality of strips secured to the bend of the first mentioned strips and having their edges extending to the active face of the packing.

6. A packing comprising a plurality of longitudinal strips doubled transversely and formed to provide a recess and adjacent lip, the strips extending around the said recess, and the edges of the strips terminating in the active face of the packing; a plurality of strips secured to the bend of the first mentioned strips and having their edges extending to the active face of the packing; and securing elements engaged through all of the strips and extending to the said recess.

In testimony that I claim the foregoing as my own, I have hereto affixed my signature in the presence of two witnesses.

CHARLES E. STOKES.

Witnesses:
H. M. ROYAL,
P. A. DURNAN.